(12) United States Patent
Van Lieshout et al.

(10) Patent No.: US 6,221,328 B1
(45) Date of Patent: Apr. 24, 2001

(54) PROCESS FOR PREPARING HYDROXYLAMMONIUM SALTS

(75) Inventors: Lambertus H. W. M. Van Lieshout, Meerssen; Peter A. C. Schevelier, Maastricht; Leonardus Lefferts, Beek, all of (NL)

(73) Assignee: DSM N.V., Te Heerlen (NL)

( * ) Notice: Subject to any disclaimer, the term of this patent is extended or adjusted under 35 U.S.C. 154(b) by 0 days.

(21) Appl. No.: 09/300,836

(22) Filed: Apr. 28, 1999

Related U.S. Application Data

(63) Continuation of application No. PCT/NL97/00581, filed on Oct. 17, 1997.

(30) Foreign Application Priority Data

Oct. 28, 1996 (BE) ...................................... 9600914

(51) Int. Cl.[7] ................................................. C01B 21/20
(52) U.S. Cl. .......................................... 423/387; 423/388
(58) Field of Search ...................................... 423/387, 388

(56) References Cited

U.S. PATENT DOCUMENTS

| | | |
|---|---|---|
| 2,628,889 | 2/1953 | Benson . |
| 3,767,758 * | 10/1973 | Mars et al. ........................... 423/387 |
| 3,996,165 * | 12/1976 | El-Ghatta et al. ................... 423/387 |
| 5,180,573 | 1/1993 | Hiramatsu et al. . |
| 5,342,603 | 8/1994 | Deremince et al. . |

FOREIGN PATENT DOCUMENTS

| | | |
|---|---|---|
| 2 231 440 | 1/1973 | (DE) . |
| 498 166 A1 | 8/1992 | (EP) . |
| 546 616 A1 | 6/1993 | (EP) . |
| 2 267360 | 11/1975 | (FR) . |
| 1 398 725 | 3/1975 | (GB) . |
| 1 499 570 | 2/1978 | (GB) . |
| 7902291 | 9/1980 | (NL) . |

* cited by examiner

*Primary Examiner*—Wayne Langel
(74) *Attorney, Agent, or Firm*—Pillsbury Winthrop LLP

(57) ABSTRACT

The invention relates to a process for preparing a hydroxylammonium salt through catalytic reduction of nitrate ions in an acid medium in the presence of a palladium and/or platinum catalyst on a carrier in which at least 0.00025 mmol halogen ions are present per $m^2$ of palladium and/or platinum area.

12 Claims, No Drawings

PROCESS FOR PREPARING HYDROXYLAMMONIUM SALTS

This application is a continuation of PCT/NL97/00581 filed Oct. 17, 1997.

The invention relates to a process for preparing a hydroxylammonium salt through catalytic reduction of nitrate ions with hydrogen in an acid medium in the presence of a palladium and/or platinum catalyst on a carrier.

This type of process is already known from NL-A-7902291. However, a drawback of this process is that, after being conducted for a relatively long time, i.e. longer than a week, the catalysts employed do not show good selectivity. This is particularly disadvantageous in the commercial production of hydroxylammonium salts.

An important application of hydroxylammonium salts is in the preparation of oximes from ketones or aldehydes, in particular the preparation of cyclohexanone oxime from cyclohexanone. A cyclic process is known for the preparation of for example cyclohexanone oxime. Thereafter, the reaction medium is buffered with acid, for example with buffers of phosphoric acid and/or sulphuric acid and the salts derived from these acids, for example alkali and/or ammonium salts.

In the hydroxylammonium synthesis nitrate ions are converted with hydrogen into hydroxylammonium ions; this proceeds according to the following equation:

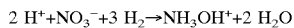

$$2\ H^+ + NO_3^- + 3\ H_2 \rightarrow NH_3OH^+ + 2\ H_2O$$

The goal of the invention is now to provide a process in which use is made of catalysts which retain an enhanced selectivity towards hydroxylammonium salt even after prolonged use and exposure to the synthesis conditions.

The goal is surprisingly achieved by incorporation of at least 0.00025 mmol halogen ions per $m^2$ of palladium and/or platinum surface area of the catalyst employed.

The upper limit for the quantity of halogen ions is at most 0.004 mmol per $m^2$ of palladium and/or platinum surface area. Preferably the halogen ions are present at a level of between 0.001 and 0.002 mmol halogen ions per $m^2$ of palladium and/or platinum surface area.

Any of the halogens of iodine, bromine, chlorine and fluorine may be utilised. Preferably use is made of iodine and/or bromine ions. The halogen ions may be applied to the catalyst for example through treatment with a halogen compound. Examples of such halogen compounds are include elemental $I_2$, $Br_2$, $Cl_2$, $F_2$, and such compounds as HI, HBr, alkali(ne earth) salts of iodine, bromine, chlorine and/or fluorine, iodinated, brominated, chlorinated and/or fluorinated aliphatic, aromatic, branched or linear hydrocarbons having 1–12 C atoms (for example methyl iodide, ethyl iodide) or mixtures thereof. Preferably use is made of the iodine- and/or bromine-containing compounds.

The catalyst treatment may take place before the (halogen-containing) catalyst is introduced into the reactor. Alternatively this treatment may also be carried out in situ, with the catalyst (whether or not halogen-containing) already being present in the reactor. The aforementioned halogen compound(s) may be used either in pure or in diluted form, optionally being dissolved in a suitable solvent. Preferably the treatment takes place before the catalyst is introduced into the reactor.

The amount of palladium and/or platinum in the catalyst is usually 0.5–20 wt. %, relative to the overall catalyst weight.

If use is made of a catalyst containing both platinum and palladium, the weight ratio of the palladium relative to the platinum will generally be between 6:4 and 9.9:0.1. Preferably the ratio will be between 7:3 and 9.5:0.5.

A solid carrier is generally used for the platinum and/or palladium catalyst. In principle, any material that is stable, i.e. that does not dissolve, pulverize, turn to slime, swell, coagulate or disintegrate in the reaction medium, can be used as the carrier. Examples of suitable carriers include activated carbon or graphite.

The palladium and/or platinum is applied to the carrier in the form of metal particles. The surface area of these metal particles is the palladium and/or platinum area. This area can be determined with the aid of CO adsorption. Usually the palladium and/or platinum area will lie between 0.5 and 20 $m^2$ per gram of catalyst.

The catalyst is usually activated, as already known from NL-A-7604669, by introduction of the presence of at least one of the metallic elements from the group comprising Cu, Ag, Au, Cd, Ga, In, Tl, Ge, Sn, Pb, As, Sb and Bi including mixtures thereof. Use can also be made of compounds containing the elements concerned, for example oxides, nitrates, phosphates, sulphates, tartrates, oxalates, formiates and acetates thereof. More than one such compound may be utilised in a mixture. The elements or the compounds can either then be applied directly to the catalyst or alternatively they can be added to the reaction medium. A very suitable result can be obtained if 0.01–5 mg of the activating element(s) from the above group is present per gram of palladium and/or platinum.

The activation with one or more of the elements mentioned above can take place both before and after the treatment with the halogen compound(s).

The $H_2$ pressure at which the catalytic reduction of nitrate ions takes place will generally be between 0.1 and 5 MPa, preferably between 0.5 and 2.5 MPa. The $H_2$ to be used can be purified beforehand. Purification can take place with the aid of, for example, activated carbon for the purpose of the removal of organic components, with a palladium catalyst for the purpose of the removal of oxygen, and/or with zinc oxide for the removal of sulphur and with a ruthenium compound for the purpose of the conversion of any CO and $CO_2$ present. Optionally, a different gas can be mixed with the $H_2$, for example helium, methane or nitrogen.

The hydroxylammonium salt will usually be prepared at a pH of between 1 and 6, preferably between 1 and 4.

The temperature will usually lie between 20 and 90° C.; preferably a temperature of between 30 and 70° C. is used.

The invention will be further elucidated with reference to the following examples without however being limited thereto.

Examples and Comparative Experiments

The examples and comparative experiments were carried out in a thermostatted chromium-nickel steel autoclave with an internal diameter of 80 mm and a volume of approximately 300 ml. This autoclave was fitted with four 8-mm wide baffles and a 6-blade turbine stirrer with a diameter of 40 mm and vanes of 10×10 mm. The autoclave was operated as a three-phase slurry reactor with a continuous flow of the liquid and gas phases, while the solid, powdered catalyst was retained in the autoclave with the aid of a polytetrafluoroethylene (PTFE) membrane filter in the liquid drain.

The autoclave was fed with the aid of a pump with an aqueous feed containing 3.2 mol/l $NO_3^-$ and 3.3 mol/l phosphoric acid buffer plus 0.1 mol/l NaOH. The phosphoric acid buffer was purified before use and before the addition of a solution containing $NO_3^-$ in the form of nitric acid and/or sodium nitrate by treating it with $H_2$ in the presence of a hydrogenation catalyst palladium on activated carbon and was then filtered to remove that catalyst and the impurities adsorbed onto that catalyst.

A constant liquid volume of 115 ml was maintained in the autoclave.

The autoclave pressure was kept at a constant level with the aid of a pressure regulator in the gas outlet; the off-gas was cooled before the pressure regulator, while the overall off-gas flow rate was measured behind the pressure regulator.

The pH in the autoclave was constantly kept at 1.8. To that end the supply of acid feed was adjusted to the amount consumed in the reaction with the aid of a pH measurement in the liquid drain and adjustment of the feed flow rate. All the products in the off-gas were analysed on-line. The concentrations of the gases $N_2$, NO and $N_2O$, formed as a result of all kinds of side- and after-reactions, in the off-gas were measured with the aid of a gas chromatography. The concentrations of hydroxylammonium salt and the $NH_4^+$ formed in side- and after-reactions plus the residual $H^+$ were determined by an automatic titrator.

In each experiment the catalyst was weighed before being introduced into the autoclave. The catalyst concentration was chosen so that the total reaction rate was virtually the same in all the examples and comparative experiments. This can be easily determined by a person skilled in the art in a simple experiment. Next, the autoclave was closed and inertised with the aid of helium.

After inertisation of the autoclave, a pressure of 4 MPa $H_2$ was established and the autoclave was filled with 115 ml of aqueous feed with the aid of a pump, leading to initiation of the reaction. All the experiments were carried out at a temperature of 55° C., a pressure of 4 MPa and a stirring speed of 1300 rotations per minute (rpm). The experiments were continued for two weeks with the dosage described above.

The catalyst was activated with the aid of Ge, which was dosed as a solution of $GeO_2$ in water, or dissolved in the aqueous feed separately from the supply of the liquid feed, in steps in the course of the experiments. $GeO_2$ was used in concentrations of 90 or 225 mg/l, of which between 5 and 10 ml was added to the autoclave in each activation step. The dosing rate was 2 ml/min in the first step, 1.5–5 ml/min in the next steps. During the activation the supply of the liquid feed to the autoclave was stopped. The first dose of approx. 0.0625 Ge ML (monolayer) was added within a few minutes (between 1 and 10 minutes) after the start of each experiment, followed by a same amount after 48 hours, to a total of 0.125 ML; then 0.06 Ge ML every 48 hours, to a total of 0.25 ML.

The term 'monolayer' is defined as follows: a full Ge monolayer equals the number of Pd and/or Pt atoms at the metal surface. This number can be determined with the aid of CO chemisorption on the assumption that each palladium and/or platinum atom at the surface can adsorb one CO molecule.

Activation took place in steps because the optimum degree of activation was not known beforehand.

Depending on the catalyst's activity, the flow rate of the aqueous feed was between 0.9 and 5 ml/min, with the concentration of the hydroxylammonium formed each time being typically 0.9–1.0 mol/l.

The activity A, expressed in mmol of converted $NO_3^-$/ $g_{met}$.h, is calculated as the sum of the product yields according to equation (1):

$$A = Y\text{-}HYAM + Y\text{-}NH_4^+ + Y\text{-}N_2 + Y\text{-}NO + Y\text{-}N_2O \quad (1)$$

Where 'HYAM' stands for hydroxylammonium, 'Y-i' for the amount of $NO_3^-$ converted into product i per hour, per gram of palladium and/or platinum, where i=hyam, $NH_4^+$, $N_2$, NO or $N_2O$. The amount of palladium and/or platinum in the catalyst in grams is $g_{met}$. The yield of the products in the liquid phase was calculated on the basis of the titrated concentrations (c) in mol/l, the liquid flow rate $Q_{feed}$ in ml/min and the amount of palladium and/or platinum weighed in with the catalyst, expressed in g ($g_{met}$), according to equation (2):

$$Y(x) = c(x) * Q_{feed} * 60 / g_{met} \quad (2)$$

where Y is the yield and x may be hydroxylammonium or $NH_4^+$. $Q_{feed}$ is calculated from the weighed decrease in the feed supply (in g) with time and the density of the liquid (g/ml) measured before use.

The yields of the products in the gas phase are calculated from the concentrations (c) in vol. % determined via gas chromatography, the off-gas flow rate $Q_{gas}$ in Nl/h and the amount of palladium and/or platinum ($g_{met}$), according to equation (3):

$$Y(y) = a * [c(y)/100] * Q_{gas} * 1000 / (24.04 * g_{met}) \quad (3)$$

where y stands for $N_2$, NO or $N_2O$ and where a=1 in the case of NO a=2 with $N_2$ and $N_2O$ The factor 24.04 is the molar gas volume in l at 0.1 MPa, 20° C.

$Q_{gas}$ is calculated by summing the gas flow rates of the supplied feed gases (measured) and the gaseous products formed (calculated), minus the summed $H_2$ consumptions (calculated) for all the products.

The selectivity S, expressed in mol. %, of each catalyst was calculated with the aid of the previously determined yield Y and activity A according to equation (4):

$$S(z) = 100 * Y(z) / A \quad (4)$$

where z stands for one of the products hydroxylammonium, $NH_4^+$, $N_2$, NO or $N_2O$.

The selectivities are hence based on the amount of $NO_3^-$ converted, as calculated on the basis of the measured products.

Example I

A 15 wt. % Pd on activated carbon supplied by Degussa, E1053 R/W, was loaded beforehand with 0.0014 mmol iodine per $m^2$ of palladium area. This was done by introducing the catalyst into water and adding the iodide drop by drop, in the form of an aqueous solution of 0.063 g of HI/l, while constantly passing $H_2$ therethrough. Next, the catalyst was removed through filtration under $H_2$ and dried. The iodide had been completely adsorbed, as was apparent from the fact that iodide was no longer demonstrable in the filtrate (<50 ppb). The area of the metal particles moreover proved to have decreased after the addition of the iodide, from 12.4 originally to 11 $m^2/g_{catalyst}$, which is in agreement with the dosage aimed at, on the assumption that, per adsorbed iodide ion, two Pd atoms are no longer available for CO chemisorption. The results are shown in Table I.

Comparative Experiment A

The 15 wt. % Pd on activated carbon of Example I was used. No iodine treatment took place. The results are shown in Table I.

TABLE I

| Example/Comparative Exp. | GE activation [ML] | S towards hydroxylammonium [mol %] |
|---|---|---|
| I | 0.0625 | 87 |
|   | 0.125  | 86 |
|   | 0.19   | 83.5 |
| A | 0.0625 | 84.5 |
|   | 0.125  | 81.6 |
|   | 0.19   | 79.5 |

The comparison of Example I and Comparative Experiment A clearly shows that the selectivity towards hydroxylammonium has increased significantly, also on a longer term, in this case operation for two weeks.

Example II

Example I was repeated with a catalyst supplied by Degussa, EF 1055 R/W, having 8 wt. % Pd and 2 wt. % Pt on activated carbon. The metal area was 7.1 $m^2$ per gram of catalyst. After the iodide treatment the area of the metal particles proved to have decreased to 6 $m^2/g_{catalyst}$.

Activation with Ge continued to 0.31 Ge ML. The second activation was carried out already after 24 hours. Then every 48 hours. The results are shown in Table II.

Comparative Experiment B

Example II was repeated, but without the iodine treatment. The results are shown in Table II.

TABLE II

| Example/Comparative Exp. | GE activation [ML] | S towards hydroxylammonium [mol %] |
|---|---|---|
| II | 0.0625 | 83 |
|    | 0.125  | 84 |
|    | 0.19   | 82.5 |
|    | 0.25   | 84 |
|    | 0.31   | 87 |
| A  | 0.0625 | 79 |
|    | 0.125  | 80 |
|    | 0.1981 | 81 |
|    | 0.2580 | 80 |
|    | 0.31   | 83 |

The comparison of example II and comparative experiment B also shows a significant increase in the selectivity towards hydroxylammonium when the catalyst was treated with iodide.

What is claimed is:

1. A process for preparing a hydroxylammonium salt comprising: conducting a catalytic reduction of nitrate ions with hydrogen in an acid medium in the presence of at least one of palladium or platinum catalyst on a carrier, wherein the catalyst includes halogen ions at a level of at least 0.00025 and at most 0.004 mmol halogen ions per $m^2$ of palladium and/or platinum surface area.

2. A process according to claim 1, wherein the halogen ions are present at a level of between 0.001 and 0.002 mmol halogen ions per $m^2$ of palladium and/or platinum surface area.

3. A process according to any one of claims 1 and 2, wherein the catalytic reduction is conducted in a reactor and the halogen ions are introduced into the catalyst prior to introducing the catalyst into the reactor.

4. A process according to claim 3, wherein the halogen ions are at least one of iodine ions or or bromine ions.

5. A process according to claim 1, wherein the carrier material comprises activated carbon or graphite.

6. A process according to claim 3, wherein the catalyst is treated with a halogen source selected from the group consisting of $I_2$, $Br_2$, $Cl_2$, $F_2$, HI, HBr, alkali metal halide salts alkaline earth metal halide salts, and halogenated aliphatic, aromatic, branched or linear hydrocarbons having 1–12 C atoms and mixtures thereof.

7. A process according to claim 6, wherein the halogen source is an iodine- and/or bromine-containing source.

8. A process according to claim 1, wherein the catalyst is activated by the presence of one or more compounds of the elements selected from the group consisting of Cu, Ag, Au, Cd, Ga, In, Tl, Ge, Sn, Pb, As, Sb and Bi.

9. A process according to claim 6, wherein said alkali metal halide salts are alkali metal salts of iodine, fluorine, chlorine or bromine.

10. A process according to claim 6, wherein said alkaline earth metal halide salts include mixed halide salts.

11. A process according to claim 6, wherein said hydrocarbon is halogenated with at least one of bromine, chlorine, fluorine or iodine.

12. A process according to claim 6, wherein in said alkaline earth metal halide salt, the halide is at least one member selected from the group consisting of anions of bromine, chlorine, fluorine and iodine.

\* \* \* \* \*